Sept. 26, 1944.   H. G. CAMPBELL ET AL   2,359,021
COMBINED LIGHTING AND AIR CONDITIONING SYSTEM
Filed Feb. 28, 1942   3 Sheets-Sheet 1
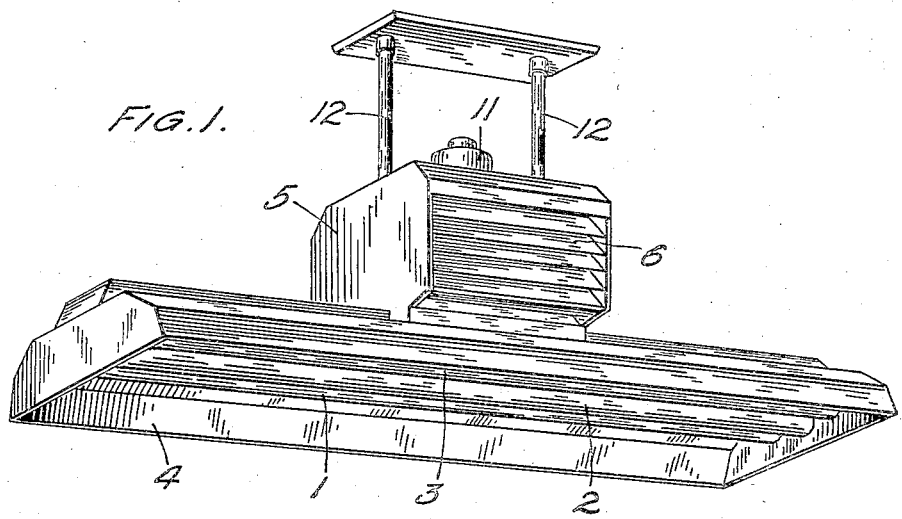
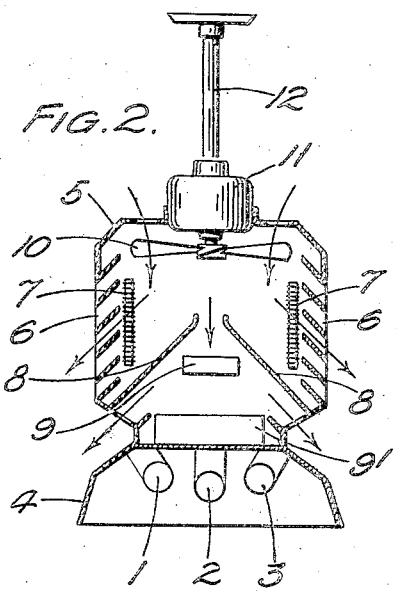

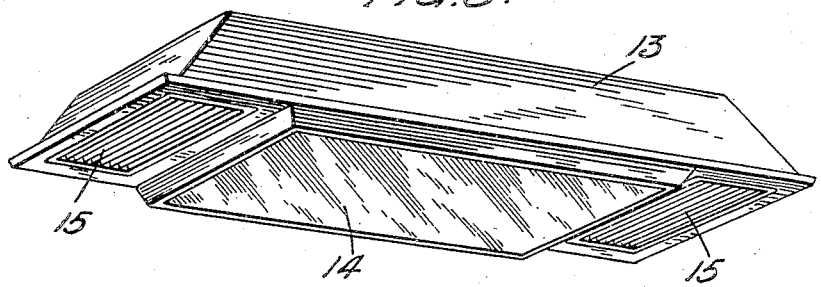
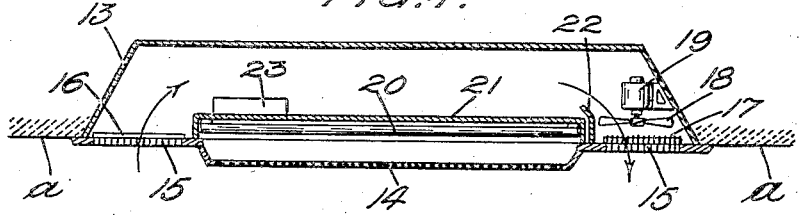
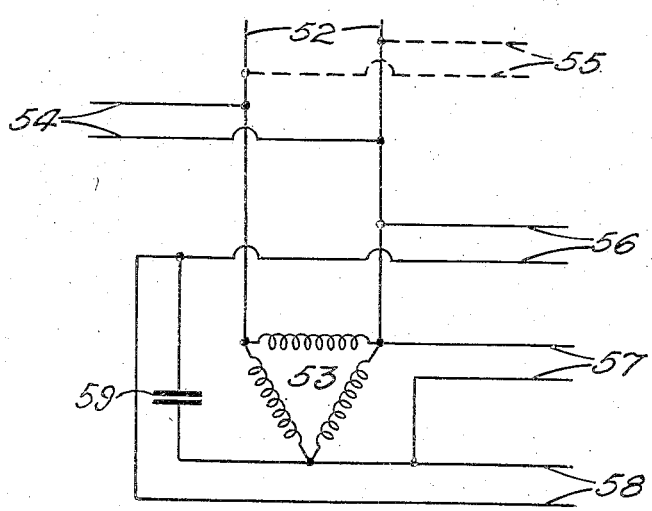

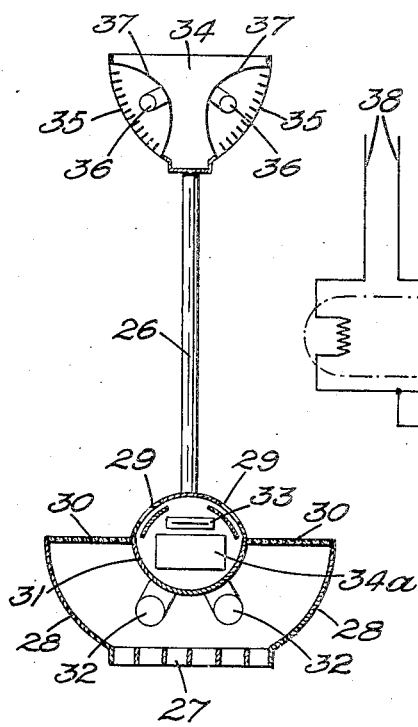
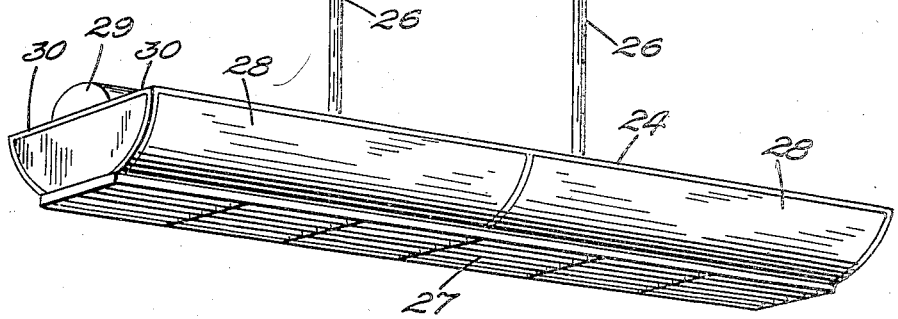
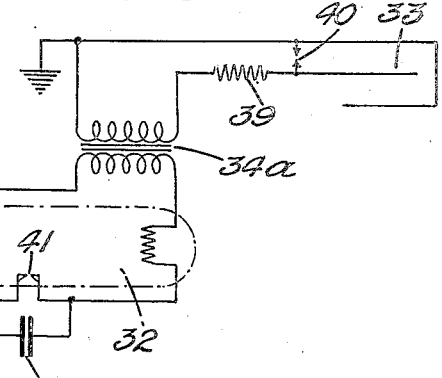

Patented Sept. 26, 1944

2,359,021

UNITED STATES PATENT OFFICE 2,359,021

COMBINED LIGHTING AND AIR CONDITIONING SYSTEM

Horatio Guy Campbell and George Donald Skinner, London, England

Application February 28, 1942, Serial No. 432,900
In Great Britain March 11, 1941

3 Claims. (Cl. 315—283)

This invention relates to combined lighting and air conditioning systems in which the conditioned air is circulated by convection or by means of a fan, and has for its primary object to enable some of the components employed to perform functions additional to their normal functions, thereby leading to increased efficiency, and saving in capital and running costs.

The invention is particularly applicable to installations in which the lighting means consists of electric discharge lamps, which employ an inductance or resistance to control the flow of current. The term "air conditioning" is intended to cover treatment of the air in one or more of several respects, viz., heating, cooling, ozonising and sterilising.

According to the main feature of the invention lighting is effected by one or more electric discharge lamps, which are controlled by an inductance or resistance and/or inductance capacity or resistance capacity constituting or forming part or parts of a device for conditioning or circulating the air. For example, if the air is ozonised the ozone transformer may serve as a controlling inductance for the lamp; if the air is heated by an electric heater the resistance winding may be used to control the lamps; whilst if a fan is used for circulating the air the windings of the fan motor may be used as a controlling inductance. The lamps may operate with any of these controls individually or with more than one at a time, the latter arrangement having the advantage that if one of the conditioning devices is switched off, for example the heater in summer, the lamps still have a control inductance afforded by the ozone transformer, or the fan motor windings or both.

It should be understood that when heating forms part of the air conditioning treatment it is not essential to use an electric heater, since a water, steam or gas radiator may be employed. For sterilising the air when required it is proposed to make use of the electric discharge lamps themselves by employing lamps of germicidal type, i. e., productive of ultra-violet rays, in which case visible light for illumination purposes is obtained by using in conjunction with the lamps a fluorescent coating, transparent or translucent screen placed in front of them.

In the case of air sterilising by means of the discharge lamps, a proportion only of the circulated air is passed over the lamps in order that the temperature of the lamps shall not be reduced below an efficient operating level. Preferably, the amount of air thus by-passed over the lamps is automatically controlled by thermostatic means in accordance with the temperature of the lamps. Thus the air by-passed in contact with the lamps performs the two-fold function of maintaining the lamps at proper working temperature and in so doing becomes sterilised.

According to another important feature of the invention the combined lighting and air conditioning units are so constructed that the light is directed downwardly upon an area below the unit, whilst the conditioned air is directed into areas adjacent to the illuminated area, in which workers will be situated.

Various kinds of lighting and air conditioning units may be devised for carrying the invention into practice. For example, one such unit according to the invention comprises a trough like reflector in which gas discharge lamps are mounted, surmounted by a chimney like casing, into the top of which air is admitted, said casing having louvred side walls and containing an air circulating fan, with or without electric heaters disposed over the louvred side walls.

Another construction of lighting unit according to the invention comprises a shallow casing having its open front closed by a wall formed by a transparent or translucent and/or fluorescent panel portion in front of the lamps, flanked by louvred panels behind one of which is located a circulating fan, with or without an electric heater, whereby air is drawn in at one louvred panel, warmed by the lamps, and discharged through the other louvred panel, with or without further heating.

In a third construction the lighting lamps are disposed in a closed casing having an upper compartment containing an ozone generator which discharges ozonised air in the upward direction, to mix with warmed air from directional heaters contained in a casing, forming a ceiling fitting below which the lamp casing is suspended.

The invention is illustrated, by way of example only, in the accompanying drawings, in which—

Figures 1 and 2 are respectively a perspective view and a diagrammatic cross-section of an industrial pendant combined lighting and air conditioning unit according to the invention, embodying air heating, ozonising and circulating means.

Figures 3 and 4 are similar views respectively of a built-in ceiling lighting and air conditioning unit, embodying air sterilising as well as air heating, ozonising and circulating means.

Figures 5 and 6 are also similar views respectively of a third construction of combined lighting and air conditioning unit according to the invention of somewhat more decorative character, embodying air ozonising, radiant heating and electric discharge lighting.

Figure 7 is a typical circuit diagram of apparatus according to Figures 1–4 inclusive; and Figure 8 is a circuit diagram corresponding to Figures 5 and 6.

Referring to Figures 1 and 2, the lighting unit comprises three tubular gas discharge lamps 1, 2 and 3 disposed longitudinally in a reflector trough 4, above which is mounted a casing 5, forming a chimney-like extension of the trough 4, having louvres 6 in its side walls to permit the passage therethrough of air entering through openings in the upper wall of casing 5, preferably through a dust filter, and circulated by a fan 10 located in the upper part of the casing 5 and driven by motor 11.

Within the casing 5 are a pair of inclined deflector plates 8, and behind the louvres 6 are heaters 7 energised from the supply mains. The ozone generator 9, energised by its transformer 9', is disposed below the passage defined by the upper edges of the deflector plates 8. The fitting is suspended from the ceiling by rods 12 attached to the top of the chimney extension 5, and the motor 11 is a three phase motor, whose windings are used as lamp ballasts as shown by the diagram of connections in Figure 7. One lamp is connected through a condenser 59. Such a motor may be operated on single phase current the same as a regular three phase motor in which one of the lines has been disconnected, as, for example, by the blowing of a fuse, and is known as a "pilot" motor. As will be appreciated, air is drawn from the room into the upper part of casing 5 and is ozonised and recirculated into the room through the heaters 7, by the fan 10. Part of the air circulated by fan 10 passes through the heaters 7 and louvres 6, and part passes through the opening between deflector plates 8 and after passing the ozoniser 9 issues through openings in the lower part of casing 5 in inclined directions on each side of the lamp trough 4. Thus a screen of relatively cool air is interposed between the lamps 1, 2 and 3 and the heated air in the upper part of casing 5 and issuing from louvres 6, whereby the lamps may be prevented from becoming heated above their most efficient working temperature. It should be noted that whereas the light from the lamps 1, 2 and 3 is directed downwardly below the fitting, the conditioned air is discharged in an angular direction on each side of the illuminated area, where a worker would be positioned who is operating the machine, or working at the bench or table, upon which the light is directed.

Referring to Figures 3 and 4, the lighting unit also acts to sterilise the air and is combined with air heating and circulating means. It is designed to be built into the ceiling a and comprises a trough-like casing 13, fronted by a panel consisting of a main visor portion 14 of glass, plastic, or other transparent or translucent material, which may have a fluorescent coating on its inner surface. The visor portion 14 is flanked by two louvred portions 15, one of which serves for the entry of air through a dust filter 16, and the other of which serves for the exit of air through the electric heater 17.

Behind the heater 17 is disposed the fan 18, and its three phase driving motor 19, and the vapour discharge lamps 20 are disposed longitudinally behind the visor portion 14 and are preferably of a germicidal type, i. e., productive of ultra-violet rays. The lamps 20 are preferably backed by an aluminium reflector 21 with open ends to allow a by-pass flow of a small part of the air current, which becomes sterilised in passing over the lamps 20. A small part only of the air current is thus sterilised, in order to avoid excessive cooling of the lamps 20. A baffle plate 22 is provided between the outlet end of the reflector 21 and the adjacent heater 17. Behind the reflector 21 may be disposed a glow switch and radio suppressor 23 of any suitable type. As in the case of Figures 1 and 2 the motor windings are used as lamp ballasts, as shown in Figure 7.

In this case air is drawn in from the room at one end of the fitting and becomes slightly heated and partly sterilised in passing along the casing 13 and reflector 21, whereafter it is circulated into the room by fan 18, after heating by heater 17. The conditioned air, similarly to Figures 1 and 2, is directed downwardly on areas adjacent to the area lighted by the lamps. Preferably, the cooling of the lamps 20 by the air passing thereover is controlled by regulation of the air flow by a thermostatic device responsive to the lamp temperature, so that they are maintained at their most efficient working temperature.

In the embodiment illustrated by Figures 5 and 6 of the drawings, the unit comprises a lower fitting 24 suspended from an upper or ceiling fitting 25 by rods 26. The lower fitting consists of a box which is roughly D-shaped in cross-section, having a central flat louvred section 27 flanked on either side by curved translucent or transparent sections 28 consisting, for example, of white translucent plastic material.

On top of the box part of the fitting is a longitudinally disposed canopy 29 anged by prismatic glass panels 30 to control the upward light emitted by the fitting. The canopy 29 together with an inner convex reflector 31 for the lamps 32, 32 forms a chamber which contains an ozone generator 33 energised by a transformer 34a also contained in the said chamber. The lamps 32, 32 are tubular discharge lamps arranged longitudinally parallel to one another within the main fitting 24. The canopy 29 is of open construction and with a double wall to allow of the circulation of ozone produced by the generator 33.

The upper or ceiling fitting 25 comprises a casing 34 which is substantially of D-shape in cross-section, with two panels 35 of directional louvres in its curved walls, one on either side of the fitting. Behind these panels, within the fitting, are radiant heaters 36, 36, behind which are disposed concave reflectors 37.

In the case of this fitting there is no forced circulation of air by a fan, but the air is heated in two downwardly and outwardly inclined directions, through the louvres 35 of the ceiling fitting 25, and this heated air becomes mixed with the ozonised air issuing from the canopy 29. As in the case of the constructions previously described it will be appreciated that the heating is applied to areas on each side of the illuminated area below the lamp.

The electrical connections of the lighting air conditioning units described above with reference to Figures 1–4 are illustrated by Figure 7, which as before mentioned shows a "pilot" motor having tapped windings on a single phase supply. It will be seen that the main supply lines are connected to the three tappings of the motor windings 53. The heater is tapped off from the mains 52 at 54: likewise the ozoniser, if employed, is tapped off as indicated by the dotted lines at 55. The three lamps are connected to leads 56, 57 and 58 as shown. Provision may be made for putting the heaters out of action as by switch means in the case of electric motors, when, as in summer months, air heating is not necessary. Where a three-phase supply is available a three phase motor can be used, in which case a lamp would be connected in each phase of the motor windings.

The unit illustrated by Figures 5 and 6 operates with the circuit illustrated by Figure 8, in which 38 indicates the supply mains connected to the lamp 32 through the primary of the ozone transformer 34ª which therefore serves as the controlling inductance for the lamp or lamps 32. The secondary winding of the transformer is earthed and connected to the ozone generator 33 through a safety resistance 39, a safety gap 40 being also provided across the generator. Associated with the lamp 32 is a starting switch 41 shunted by a suppressor condenser 42.

The invention may be carried into practice without the aid of self-contained fittings such as have been described above with reference to the drawings. For example, in one such arrangement according to the invention, air may be drawn in from the top of a room through grilles near the ceiling into ducts leading through the walls to discharge grilles located at floor level, electric discharge lamps of germicidal type being arranged in said ducts together with a circulating fan, with or without an electric heater behind the discharge grilles, and with or without an ozone generating device. If it is desired to use the lamps for lighting the room the ducts in the wall may communicate with the room through openings at a suitable level, behind which the lamps are located, and which are suitably covered with panels of transparent or translucent material such as glass, plastic or the like, coated with fluorescent material.

Although units according to the invention may be used independently for heating and circulating air, a number of such units may be used in conjunction with one another so that the current of conditioned air may be discharged from one unit upon an area adjacent to the area illuminated by another unit. Said units may be linked up to a common air conditioning system for a building, and the lighting circuit may include one or more ultra-violet ray generators and/or ozone generators for sterilising and/or ozonising the air during circulation. The step-up transformers of such devices may serve for the control of one or more lighting sources, the various electrical components being selected and balanced to give a good power factor correction and low current consumption. Preferably, the heating circuit of such a combined system would be thermostatically controlled.

As will be appreciated from the foregoing, many modifications and other constructions are possible in regard to the apparatus and equipment used for carrying into practice the improved system of lighting and air conditioning according to the invention. For example, steam or other mechanical radiators may be used instead of electric heaters for heating the air prior to recirculation, in which case the lamps would only be controlled by the inductance of the fan motor winding, or of the ozone transformer, or both.

What we claim and desire to secure by Letters Patent is:

1. A combined lighting and air conditioning system for operation off constant potential power mains, comprising discharge lighting apparatus which lighting apparatus has series ballast apparatus connected therewith for stable operation, and a motor driven fan having its winding forming a portion of the ballast apparatus whereby the ballast apparatus functions with either the lighting apparatus or the fan or with both.

2. The system according to claim 1, wherein the lighting apparatus has a light directing reflector, and the fan is so disposed relative to the lighting apparatus as to direct the air adjacent to illuminated areas.

3. The system according to claim 1, wherein the discharge lighting apparatus is productive of germicidal ultra-violet rays, the fan directs part of the air past the discharge lighting apparatus for sterilization, and having a fluorescent screen to intercept ultra-violet rays and render the radiation visible.

HORATIO GUY CAMPBELL.
GEORGE DONALD SKINNER.